Bruce J. Williams
Johney Katich
INVENTORS

United States Patent Office 3,501,126
Patented Mar. 17, 1970

3,501,126
HIGH CONDUCTANCE, HIGH PRESSURE VALVE
Bruce J. Williams, Arvada, and Johney Katich, Boulder, Colo., assignors to the United States of America as represented by the United States Atomic Energy Commission
Filed Nov. 9, 1967, Ser. No. 681,684
Int. Cl. F16k 31/50
U.S. Cl. 251—77                    1 Claim

ABSTRACT OF THE DISCLOSURE

A high conductance valve capable of high pressure shutoff comprising a body, a cap or bonnet fastened thereto, a tapered disk with mating seat, and plural stems loosely interconnected by a floating stem coupling.

BACKGROUND OF INVENTION

Generally, a valve which operates across a high pressure differential is not of high conductance (having large orifices and/or relatively straight passageways to reduce pressure drop) because the high pressure differential may be consumed in forcing the desired flow through the valve. However, where the valve is subjected to more than one set of flow-pressure requirements, a high conductance in addition to high pressure capability may be a desirable valve characteristic. For instance, if it is desirable in purging a vessel to first evacuate the vessel and then subject it to a high pressure, a valve may be required to first pass a large volume of gas at a low pressure drop and then seal tight against a high pressure differential.

Valves generally include large stems relative to orifice size with heavy guide threads so as to withstand stress resulting from high pressure differentials. Consequently the large stems may impede flow through the valve. Furthermore, if a valve is designed to operate or pass fluid at a high pressure differential, the orifice therein may be smaller than would be required if the allowable pressure drop were small per unit of required flow. Therefore, the ordinary valve designed for high pressure does not have an orifice or conductance large enough to pass substantial flow at the lower pressure differentials provided by ambient conditions during a vessel evacuation.

Rising stem valves having high conductance generally include relatively small stems to avoid restriction or must have oversized bodies and/or orifices to accommodate large high strength stems. Normally, high conductance valves are not provided with high strength stems or guide threads and accordingly, high pressure exerted on the valve closure member or disk may deform the stem or strip the travel guide threads. A rotary disk or butterfly valve may have the necessary large opening for high conductance but may not give tight shut off or may not withstand high pressure differentials.

Other problems inherent with high pressure shutoff valves arise from the desirability of a tapered disk and seat which allows a wedge tight seal against pressure. Galling may result from the rotary interaction at the seat and disk interface during tightening of a screw operated stem valve. Also where high pressure is maintained in the valve compartment adjacent the cap or bonnet, the bonnet may stretch causing the disk to lift from the seat, followed by leakage.

SUMMARY OF INVENTION

It is therefore an object of this invention to provide a valve having high conductance and high pressure shutoff capability.

It is a further object to provide a valve which will relieve the stress on the valve stem and travel guides at high pressure differentials.

It is also an object to provide a high pressure shutoff, valve having a tapered closure member or disk and seat which will not gall on closing or separate at high pressure.

Various other objects and advantages will appear from the following description of one embodiment of the invention, the most novel features will be pointed out in the appended claims.

The invention is a high pressure shutoff, high conductance, valve comprising a valve body with tapered seat, a valve cap or bonnet having stem travel guides or means for selectively setting the stem, a first valve stem portion engaging said travel guides, an additional valve stem portion with a tapered closure member which matches said tapered seat, and a floating coupling or joining means connecting and axially aligning said valve stems.

DESCRIPTION OF DRAWINGS

One embodiment of the invention is described in the accompanying drawings wherein.

DETAILED DESCRIPTION

Figures 1, 2:
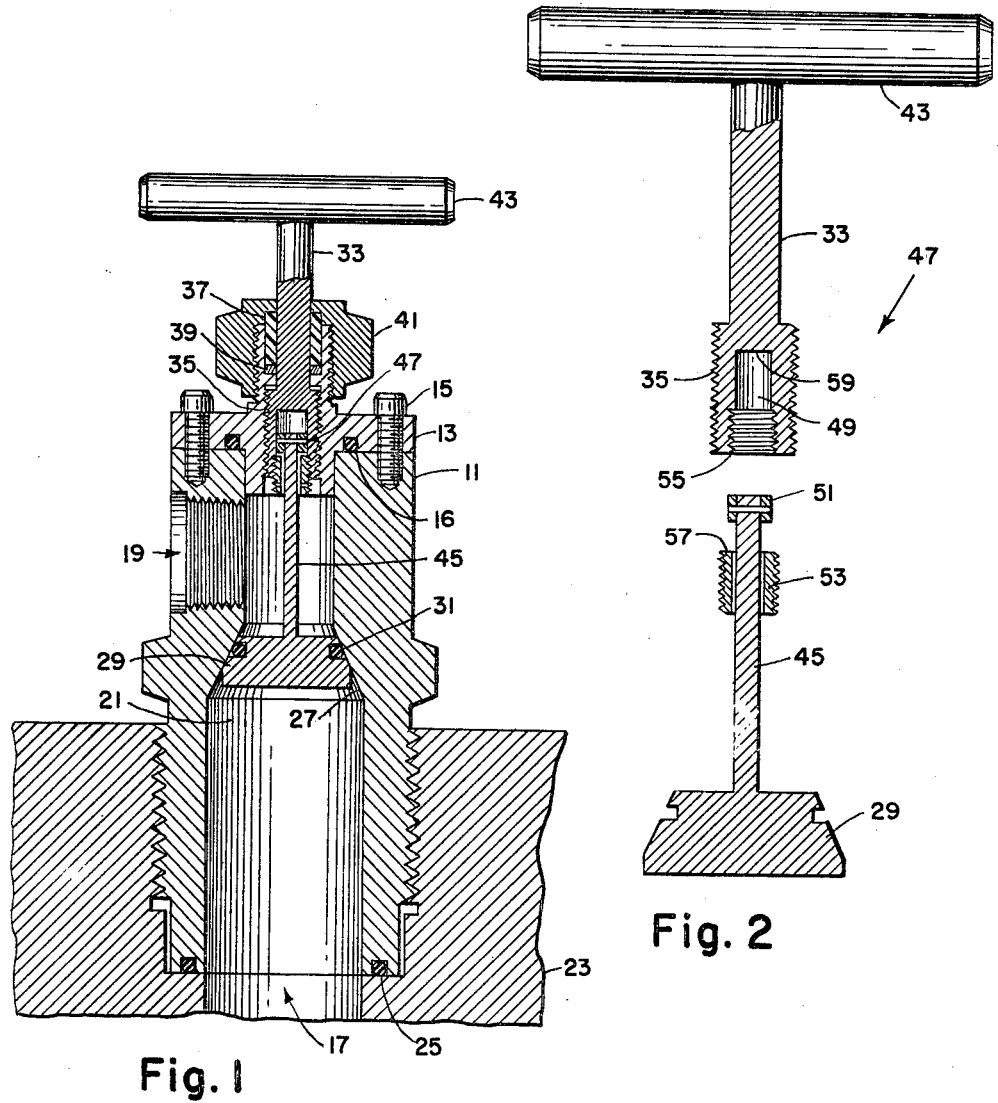
FIG. 1 is an elevation cross-sectional view of a valve.
FIG. 2 is an enlarged view of a disassembled cross section of the floating stem coupling connecting the two stems of the valve in FIG. 1.

The valve shown in FIG. 1 includes a body 11 and a cap or bonnet 13 attached thereto by threaded bolts or other fasteners 15 with a sealing ring 16 disposed therebetween. The valve body may be mounted against a gasket or O-ring 25 on a plate, nut, vessel or line 23. The valve body 11 may have inlet and outlet ports 17 and 19 on both extremities flow-wise of a valve compartment 21. Machined or attached within the valve compartment 21 may be a tapered valve seat 27 and mating valve disk or plug 29. A resilient O-ring 31 may be retained within a circumferential groove in the tapered surfaces of the disk 29 or the seat 27 to insure tight sealing.

A first valve stem portion 33 may engage travel guide threads 35 on an internal circumference of valve bonnet 13 for selective setting of the valve stem. Alternatively a sliding stem arrangement for valve travel may be used with suitable travel guides. Valve stem portion 33 may be sealed around its entrance into the bonnet 13 by packing 37 retained by washer 39 and tightened by threaded gland nut 41. Stem travel may be effected by turning handle 43 affixed to the extremity of valve stem 33 adjacent packing 37.

A second or additional valve stem portion 45 may support the valve disk 29 and be connected and aligned to the first valve stem 33 by a floating or loosely interconnecting stem coupling or joining means 47 which is shown enlarged in FIG. 2. An open ended axial chamber or socket 49 may be affixed to or formed in valve stem 33 longitudinally opposite handle 43. An end cap or boss 51 may be pinned or otherwise attached to valve stem 45 forming an enlarged portion thereon longitudinally opposite valve disk 29. A suitable retaining nut or bushing 53 may loosely encompass valve stem 45 intermediate cap 51 and disk 29. On assembly, the enlarged portion 51 may slide within axial chamber or socket 49 and be retained therein by bushing 53. Bushing 53 may engage threads 55 within the mouth or opening of socket 49. Consequently, valve stem portion 45 will be allowed to telescope or float within the limits defined by surface 57 of retaining bushing 53 disposed towards the axial chamber 49 and surface 59 of the axial chamber disposed opposite the mouth or opening thereof. Hence, the two valve stem portions being loosely interconnected, may independently move in relation to each other.

The valve in FIG. 1 may operate by connecting port 17 to a vessel which is to be evacuated and subsequently subjected to high pressure such as about 10,000 p.s.i. The disk 29 may be lowered to open the valve by rotating handle 43. Since stem 45 is small in cross section relative to the valve seat orifice a relatively large opening and accordingly high conductance is available for evacuating the vessel. To pressurize the vessel (through a suitable means not shown), the valve may be closed hand tight such that the tapered disk firmly engages the valve seat without sufficient shearing force to produce galling. When a high pressure is exerted on disk 29 through port 17, the disk will be tightly wedged into seat 27 compressing O-ring 31 thereagainst to form a leak tight seal. No compressive forces will be exerted on valve stem 45 as the floating coupling 47 will accommodate longitudinal movement by the disk and stem resulting from line pressure. Accordingly no undesirable cross-thread forces will be exerted on the valve stem guide threads 35 and the possibility of damage to them is minimized.

The taper of the closure member or disk 29 and seat 27 is shown as converging towards the valve stem and packing gland but may be reversed if desired. However, the high pressure connection should then preferably be changed from port 17 to port 19 so that the pressure differential will seat rather than unseat the disk, otherwise the benefits of the floating stem coupling will not be as fully realized. High pressure communicating with port 19 will be exerted on and may tend to stretch the bonnet 13, but any resulting bonnet stretch will not unseat the disk 29 or blow out the O-ring 31 as such stretch will be accommodated in the floating stem coupling. High pressure on the bonnet side of the valve seat may tend to cause leakage about the fasteners 15 and gland nut 41 if not complete seal failure. Thus, it is preferable to maintain the lower valve pressure adjacent the bonnet and seals with the taper of the closure member and seat converging toward the valve stem.

The floating stem coupling or joining means 47 is shown with the axial chamber or socket 49 formed in the first or partially external valve stem having the handle 43 affixed thereto; the enlarged portion is attached to the second valve stem opposite the disk. This arrangement may be reversed if desired such that the socket is a part of or affixed to the second valve stem longitudinally opposite the valve disk while the end cap may be attached to the first valve stem portion which communicates with the handle. This latter arrangement may require a longer bonnet as the socket 49 and valve stem guide threads may not be easily overlapped longitudinally.

O-ring 31 provides tight shut off when the valve is used to seal against high gas pressure. It may be retained in the seat as well as the disk or could be replaced by various arrangements of fiber, plastic, or rubber resilient seats and/or disks. The ring may be completely omitted if the valve is used in liquid service, but it may then be desirable to use a soft metal such as brass for the disk and seat.

The valve may be constructed of any suitable material compatible with the process fluids. For instance steel or brass might be used for the metallic parts while neoprene or Teflon may be selected for packing, gaskets and O-rings.

The invention provides a valve having high conductance and ability to tightly close against high pressure. Valves of this design may be made in various sizes. For instance, an approximately one inch valve will seal tight against about 22,500 p.s.i. hydrostatic and about 15,000 p.s.i. air pressure. The floating stem coupling prevents compressive stress on the valve stem thus eliminating or minimizing risk of stem deformation and also preventing shearing stress on the valve stem guide threads which would tend to cause stripping. Furthermore, the floating stem coupling allows the line pressure to tightly wedge the tapered disk and plug together without gall producing, shearing forces which would otherwise be required for tight seating.

It will be undestood that various changes in the details, materials, and arrangements of the parts, which have been herein described, may be made by those skilled in the art within the scope of the invention expressed in the following claim.

What is claimed is:

1. A high conductance, high pressure valve comprising a body having a passageway therethrough with inlet and outlet ports, a tapered seat within said body and forming part of said passageway, a bonnet secured to said body, a valve stem portion extending into said bonnet having an internally threaded socket depending from the end thereof, means interengaging said body and valve stem portion for selective setting of said stem, a closure member having a peripheral seat complementary to said tapered seat for engagement therewith to close and open said passageway and having a circumferentially extending retaining groove spaced from upper and lower portions of said peripheral seat, a resilient O-ring disposed in said groove intermediate the upper and lower portions of said seat for sealing against said tapered seat, an additional valve stem portion secured at one end to said closure member and projecting into said socket having a dimension substantially less than said passageway, and separable joining means loosely interconnecting said valve stem portions for accommodating independent longitudinal movement of one stem portion with respect to the other stem portion while limiting transverse movement thereof, said joining means including an annular end cap encircling an end portion of said additional valve stem and a transverse locking pin projecting through said end cap and valve item, said end cap having a dimension greater than said additional valve stem and closely fitting within said socket, and a threaded member of uniform external diameter throughout the length thereof slideably encircling said additional valve stem engageable with said socket threads with an internal dimension less than said end cap.

References Cited

UNITED STATES PATENTS

| 285,953 | 10/1883 | Barr | 251—82 |
| 685,748 | 11/1901 | Davis | 251—82 XR |
| 862,614 | 8/1907 | Davey | 251—82 |
| 963,836 | 7/1910 | Varlie | 251—82 |
| 1,369,444 | 2/1921 | Koplin | 251—82 |
| 1,694,234 | 12/1928 | Schimmel | 251—275 XR |

FOREIGN PATENTS

| 730,977 | 8/1932 | France. |

RONALD FELDBAUM, Primary Examiner